May 26, 1953 W. A. LEDWITH 2,639,885
ROTOR CONSTRUCTION FOR COMPRESSORS AND TURBINES
Filed March 23, 1950
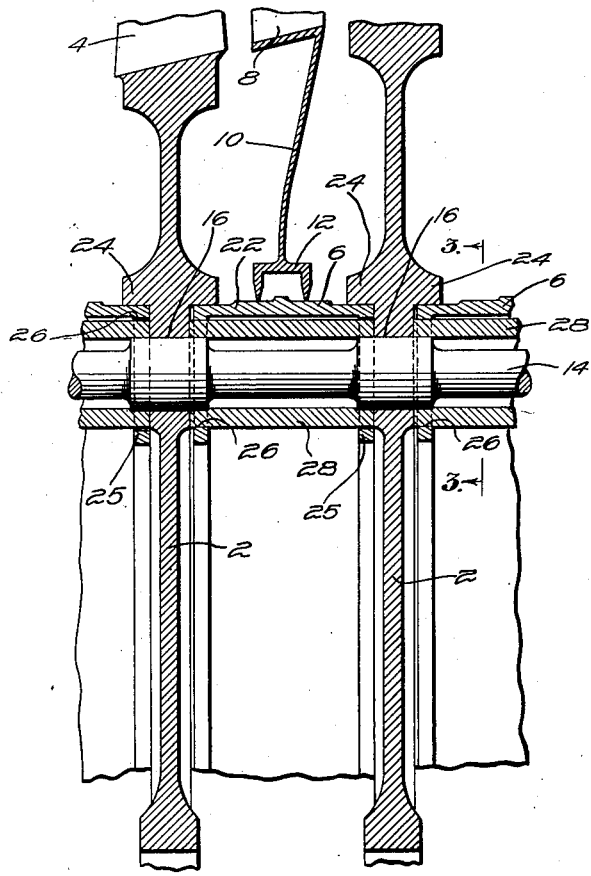
Inventor
Walter A. Ledwith
by Charles A. Warren
Attorney Patented May 26, 1953

UNITED STATES PATENT OFFICE 2,639,885

ROTOR CONSTRUCTION FOR COMPRESSORS AND TURBINES

Walter A. Ledwith, Glastonbury, Conn., assignor to United Aircraft Corporation, East Hartford, Conn., a corporation of Delaware Application March 23, 1950, Serial No. 151,354

8 Claims. (Cl. 253—39)

This invention relates to axial flow compressors or turbines and particularly to the spacer construction provided between adjacent discs of a multistage rotor.

In making a multistage rotor for either a compressor or a turbine the several aligned discs each carrying blades on its periphery are clamped together in end-to-end relation either by a central bolt or by a ring of axially extending bolts positioned in aligned holes in the discs. The discs are held in axially spaced relation to provide for the positioning of a row of stationary vanes between adjacent rows of blades. The spacing means are generally annular flanges on opposite sides of each disc engaging with similar flanges on the adjacent discs. The clamping bolts are generally located adjacent to these flanges to minimize bending loads on the discs. In many cases these flanges have cylindrical outer surfaces which provide sealing surfaces cooperating with the diaphragm seals carried by the vanes.

The spacing flanges are generally made thick enough to enclose the bolt fully thus requiring that the radial thickness of the flange be greater than the diameter of the bolts as shown for example in Meier Patent 2,427,614. Where the weight of the power plant is critical, as in aircraft power plants, the excessive thickness of these flanges causes unnecessary weight. To reduce this weight it has been suggested that the flanges be reduced in thickness between adjacent bolts, but this proposal requires extensive machining operations on the flanges. A feature of the present invention is a disc spacing device that requires little machining, is light in weight, and adequately spaces the discs. Another feature is a spacer that presents a smooth outer surface for engagement with stationary diaphragm seals but which is relatively light in weight.

Other objects and advantages will be apparent from the specification and claims, and from the accompanying drawings which illustrate an embodiment of the invention.

Fig. 1 is a longitudinal sectional view through a rotor utilizing the spacing device.

Fig. 2 is a fragmentary sectional view on a larger scale showing a part of one of the spacers.

Fig. 3 is a transverse sectional view along the line 3—3 of Fig. 2.

Fig. 4 is a fragmentary view similar to Fig. 2 showing a modification.

The invention is shown in a compressor rotor although it will be understood that the invention is equally applicable to a turbine rotor. In the arrangement shown, the compressor rotor includes a plurality of discs 2 each having a row of blades 4 on its periphery. The discs are spaced apart by spacing devices 6, hereinafter described in detail, such that the stationary vanes 8 of the stator may be positioned between adjacent rows of blades. The diaphragm 10 extending inwardly from the inner ends of the stationary vanes 8 may carry a diaphragm seal 12 which cooperates with the spacer device for preventing leakage of power fluid around the inner ends of the stationary vanes.

The discs which are in axial alignment are clamped in proper relation to each other by a row of through bolts 14 which are arranged in a ring around the axis of the discs and extend through aligned openings 16 in the discs. The bolts may also clamp the end bells 18 at opposite ends of the rotor, these end bells providing the journals for the rotor. Clamping nuts 20 on the ends of the bolts retain the discs and end bells securely together.

The spacing device 6, above mentioned, includes a sleeve 22 substantially as wide as the space between the discs where the sleeve is to be positioned and the diameter of this sleeve is such that it will just fit inside of cylindrical flanges 24 provided on opposite sides of each of the discs 2. The outer surface of this sleeve being concentric with the axis of the discs provides a cylindrical surface to cooperate with the seals 12.

The sleeve has inwardly extending flanges 25 on opposite ends which extend parallel to the planes of the discs. These flanges have openings 26 which receive the through bolts 14. The openings 26 also receive spacing tubes 28 one of which is positioned around each bolt between adjacent discs and is preferably a loose fit in one of the flanges 25 and a press fit in the other flange for facilitating the assembly of the parts.

These spacer tubes are readily machined since all of the tubes extending between any pair of discs would all be the same length. In machining the spacer tubes it is possible to assure uniform length by assembling the tubes in the supporting sleeve and then machining both ends of the assembled tubes.

The spacer sleeve 22 is relatively simple to manufacture, as will be apparent, and thus the entire spacer device is relatively inexpensive. The device (by the spacer sleeves) supports the spaced discs both in bending (by the tubes and bolts) and in torsion and shear (by the spacer sleeves).

The spacer sleeve may be made slightly shorter than the tubes, as shown in Fig. 2, so that if the seal 12 rubs on the sleeve and heats it, the local thermal expansion of the sleeve will not distort the rotor.

The discs and spacers both "grow" in dimension in operation. The above described structure is more advantageous where the spacer sleeve grows more than the discs, since, with the spacer sleeve piloted on its outside diameter by the flanges 24, the differential growth will maintain a tight fit between the flanges and the sleeve.

Where the discs grow more than the spacer sleeve, the sleeve 6', Fig. 4, may be piloted on its inside diameter by providing the discs with supporting flanges 24' inside of the row of bolt holes. These flanges engage the inside diameter of the sleeve, that is the inner edges of the spacer flanges 28'. Thus the differential growth will maintain a tight fit between the spacer sleeve and the disc flanges.

It is to be understood that the invention is not limited to the specific embodiment herein illustrated and described, but may be used in other ways without departure from its spirit as defined by the following claims.

I claim:

1. In a rotor construction, a plurality of discs each having a row of blades on its periphery, a series of through bolts extending through said discs and arranged in a ring surrounding and spaced from the axis of the discs, and a sleeve extending between adjacent discs and surrounding the ring of bolts, said sleeve having inwardly extending flanges at opposite ends engaging with adjacent discs, said flanges having aligned openings therein to receive the bolts, and tubes around said bolts and fitting tightly in certain of the openings of the sleeve for spacing the discs apart, the ends of said tubes engaging the side surfaces of the discs, the sleeve functioning to support the tubes in position during assembly of the rotor.

2. In a rotor construction, a plurality of discs each having a row of blades on its periphery, a series of through bolts extending through said discs and arranged in a ring surrounding and spaced from the axis of the discs, a series of tubes on the bolts and extending between and engaging with adjacent discs to hold them in spaced relation, and a sleeve slightly shorter than the tubes and extending around the ring of the tubes on the bolts, and having at least one flange thereon with openings surrounding and supporting said tubes.

3. In a rotor construction, a plurality of discs each having a row of blades on its periphery, a series of through bolts extending through said discs and arranged in a ring surrounding and spaced from the axis of the discs, a series of tubes on the bolts and extending between adjacent discs to hold them in spaced relation the ends of the tubes engaging the surfaces of the discs, and a sleeve slightly shorter than the tubes and extending around the ring of tubes on the bolts and engaging with said tubes, said sleeve having openings therein to receive and position the tubes.

4. In a rotor construction, a plurality of discs each having a row of blades on its periphery, a series of through bolts extending through said discs and arranged in a ring surrounding and spaced from the axis of the discs, a series of tubes on the bolts and extending between adjacent discs to hold them in spaced relation the ends of the tubes engaging the surfaces of the discs, and a sleeve slightly shorter than the tubes and extending around the ring of tubes of bolts and engaging with said tubes, said sleeve having spaced flanges on opposite ends with openings to receive and position the tubes the latter projecting slightly beyond the outer surfaces of the flange at least at one end.

5. In a rotor construction, a plurality of discs each having a row of blades on its periphery, a series of through bolts extending through said discs and arranged in a ring surrounding and spaced from the axis of the discs, a series of tubes on the bolts and extending between adjacent discs to hold them in spaced relation the ends of the tubes engaging the surfaces of the discs, and a sleeve shorter than the tubes extending around the ring formed by the tubes on the bolts and having at least one inwardly extending flange with openings therein to engage with and support said tubes, said discs having axially extending flanges thereon engaging with the sleeve to hold it radially in position.

6. In a rotor construction, a plurality of discs each having a row of blades on its periphery, a series of through bolts extending through said discs and arranged in a ring surrounding and spaced from the axis of the discs, a series of tubes on the bolts and extending between adjacent discs to hold them in spaced relation the ends of the tubes engaging the surfaces of the discs, and a sleeve extending around the ring formed by the tubes on the bolts and having openings therein engaging with and supporting said tubes, said discs having axially extending flanges positioned radially outward of the ring of bolts and engaging with the outer surface of the sleeve, said sleeve being slightly shorter than the tubes such that the spacing of the discs is provided by the tubes.

7. In a rotor construction, a plurality of discs each having a row of blades on its periphery, a series of through bolts extending through said discs and arranged in a ring surrounding and spaced from the axis of the discs, a series of tubes on the bolts and extending between adjacent discs to hold them in spaced relation the ends of the tubes engaging the surfaces of the discs, and a sleeve extending around the ring formed by the tubes on the bolts and having at least one inwardly extending flange with openings therein to engage with and support said tubes, said discs having axially extending flanges positioned radially inward of the ring of bolts and engaging with the inner surface of the sleeve, said sleeve being slightly shorter than the tubes such that the spacing of the discs is provided by the tubes.

8. In a rotor construction, a plurality of discs each having a row of blades on its periphery, a series of through bolts extending through said discs and arranged in a ring surrounding and spaced from the axis of the discs, a series of tubes on the bolts and extending between adjacent discs to hold them in spaced relation the ends of the tubes engaging the surfaces of the discs, and a sleeve extending around the ring formed by the tubes on the bolts and engaging with and supporting said tubes, said sleeve having spaced flanges on opposite ends with openings to receive the tubes, said discs having axially extending flanges positioned radially outward of the bolts and engaging with the outer surface of the sleeve, said sleeve being slightly shorter than the tubes such that the spacing of the discs is provided by the tubes.

WALTER A. LEDWITH.

References Cited in the file of this patent

UNITED STATES PATENTS

| Number | Name | Date |
| --- | --- | --- |
| 790,426 | Dodge | May 23, 1905 |
| 794,612 | Goldsborough | July 11, 1905 |
| 803,362 | Rice | Oct. 31, 1905 |
| 822,257 | Emmet | June 5, 1906 |
| 880,479 | Buck | Feb. 25, 1908 |
| 980,732 | Anderson | Jan. 3, 1911 |
| 2,427,614 | Meier | Sept. 16, 1947 |